United States Patent [19]

Yuyama et al.

[11] Patent Number: 5,059,479

[45] Date of Patent: Oct. 22, 1991

[54] PRESSURE-SENSITIVE ADHESIVE EMULSION COMPOSITION AND A KRAFT TAPE USING IT

[75] Inventors: Hajime Yuyama, Minoo; Fumio Maekawa, Suita; Kazuo Umekage, Kamimaki, all of Japan

[73] Assignee: National Starch and Chemical Investment Holding Corporation, Wilmington, Del.

[21] Appl. No.: 458,866

[22] Filed: Dec. 29, 1989

[51] Int. Cl.$^5$ .................... C08L 95/00; B32B 7/12; B32B 11/02

[52] U.S. Cl. ................................ 428/323; 525/545; 106/277; 428/351; 428/355; 428/491

[58] Field of Search ............ 525/54.5; 106/277; 252/311.5; 428/343, 351, 491, 323, 355

[56] References Cited

U.S. PATENT DOCUMENTS

| | | | |
|---|---|---|---|
| 3,577,249 | 5/1971 | Dybalski | 106/277 X |
| 4,007,127 | 2/1977 | Smadja et al. | 106/277 X |
| 4,361,663 | 11/1982 | Agarwal et al. | 525/54.5 X |
| 4,426,419 | 1/1984 | Uffner et al. | 525/54.5 X |
| 4,654,385 | 3/1987 | Roberts et al. | 428/351 X |
| 4,775,567 | 10/1988 | Harkness | 428/351 X |

FOREIGN PATENT DOCUMENTS 57-16082 1/1982 Japan.
58-185668 10/1983 Japan.
58-187476 11/1983 Japan.
58-194996 11/1983 Japan.

*Primary Examiner*—George F. Lesmes
*Assistant Examiner*—D. R. Zirker
*Attorney, Agent, or Firm*—Edwin M. Szala

[57] ABSTRACT

A pressure-sensitive adhesive emulsion composition, characterized in that it is a pressure-sensitive adhesive emulsion composition containing the ingredients (A) and (B) below; the content of ingredient (B) is set at 1–70 solid parts per 100 solid parts by weight of the emulsion composition.

(A) A polymer derived from at least one compound selected from a group including alkyl acrylates, alkyl methacrylates, and vinyl compounds, and having a glass transition temperature in the range of $-60°$ C. to $-30°$ C.

(B) A bituminous emulsifier with an average particle diameter of the emulsified particles of 0.5–3.0 $\mu$m.

4 Claims, No Drawings

PRESSURE-SENSITIVE ADHESIVE EMULSION COMPOSITION AND A KRAFT TAPE USING IT

BACKGROUND OF THE INVENTION

This invention concerns a pressure-sensitive emulsion composition used in pressure-sensitive tapes, etc., and a kraft tape using this composition.

CONVENTIONAL TECHNOLOGY

In general, acrylic high-molecular-weight polymer emulsions obtained by emulsion-polymerizing alkyl acrylates or alkyl methacrylates in an aqueous medium are used in the (pressure)-sensitive adhesive layer of pressure-sensitive tapes, etc. This kind of emulsion is desirable from the points of view of energy conservation, environmental protection, and safety, since organic solvents are not used, and it has excellent adhesive properties and durability. Therefore, it has become widely used to replace the former natural rubber and synthetic rubber pressure-sensitive adhesives. This kind of acrylic high-molecular-weight polymer emulsion is generally manufactured by emulsion-polymerizing acrylic unsaturated monomers, together with acrylic acid, vinyl esters, or other modified monomers, if desired, in an aqueous medium, by the semi-continuous, two-stage, or power feed, etc., methods. Acrylic high-molecular-weight polymer emulsions obtained by these methods provide high cohesive forces as pressure-sensitive adhesives, since the acrylic high-molecular-weight polymers which are their principal ingredients have comparatively high molecular weights, compared to high-molecular-weight polymers made by solution polymerization. On the other hand, however, acrylic high-molecular-weight polymer emulsions have adhesive forces which are insufficient in practice in normal states and at low temperatures with respect to vessels, the surfaces of which consist of low-polarity polyolefin resins, e.g., polyethylene or polypropylene, etc., and films made of these resins; increases in these adhesive forces are strongly desired. Ordinarily, such adhesives are required to have good pressure-sensitive triple properties (adhesive force, cohesive force, and tack). Consequently, it should be possible to increase the adhesive forces of acrylic high-molecular-weight polymer emulsions, also, with respect to polyolefin resins by increasing the aforementioned triple properties, especially the adhesive force. However, it is also necessary to maintain a balance between these three properties, and it is impossible to increase the adhesive force while maintaining this balance, simply by changing the composition of the acrylic high-molecular-weight polymer itself. For example, when one wishes to increase the tack, the glass transition temperature of the pressure-sensitive adhesive polymer is generally lowered, but as a result, creep is increased, and the cohesive force is decreased. In order to avoid this, the molecular weight or the degree of crosslinking may be increased, but if this is done the adhesive force is now reduced. If one wishes to increase the adhesive force, a method for increasing the wettability is performed (adjustment of the viscous flowability, reduction in surface tension), but this reduces the cohesive force. Consequently, it is difficult to increase the adhesive force under normal conditions and at low temperatures with respect to low-polarity polyolefin resins, etc., by selecting the composition of the acrylic high-molecular-weight polymer itself, e.g., by selecting the kind of acrylic monomer used.

Therefore, the approach is used of not adjusting the composition of the polymer itself, which is the principal ingredient of the acrylic high-molecular-weight polymer emulsion, but of using other ingredient materials together with the aforementioned acrylic high-molecular-weight polymer. For example, in order to improve the adhesive force under normal conditions with respect to low-polarity polyolefins, the method of blending a tackifying agent resin emulsion with the acrylic high-molecular-weight polymer has been considered. However, if this is done, the particles of the acrylic high-molecular-weight polymer and the particles of the tackifying agent resin do not uniformly mix and disperse in the emulsion, so that the adhesive force under normal conditions is not sufficiently increased. Moreover, if the pressure-sensitive adhesive layers of pressure-sensitive tapes or pressure-sensitive sheets are made by using such an acrylic high-molecular-weight polymer-tackifying agent resin emulsion, the difficulty is created that, since the structural viscosity of the emulsion is high, the workability when the emulsion is applied by roller applicators, etc. (suitability for roller application) is poor, and operations become difficult. In order to remedy this, a method (Public Patent Disclosure Bulletin No. 58-185668) has been proposed in which the tackifying agent resin emulsion is not simply blended, but it is added during the synthesis of the acrylic high-molecular-weight polymer, and an acrylic high-molecular-weight polymer containing a tackifying agent resin is manufactured. However, with this method, in reaction systems in which seed polymers which can become nuclei of polymers are not present at all, since the initial polymerization of the acrylic monomer is performed in the presence of a tackifying agent resin, most of the polymer particles produced are finally dispersed individually in water, and the low-temperature adhesive force cannot be raised in the same manner as the adhesive force under normal conditions. Moreover, another method which has been proposed (Public Patent Disclosure Bulletin No. 57-16082) is one in which the adhesive force with respect to polyolefin resins under normal conditions is increased by performing seed polymerization by using an emulsion of an ethylene-vinyl acetate copolymer (vinyl ester copolymer) and dropping a pre-emulsion of an acrylic monomer into it. Furthermore, methods have also been proposed (Public Patent Disclosure Bulletin Nos. 57-187476 and 58-194996) in which emulsion adhesives with increased adhesive forces with respect to polyolefin resins under normal conditions are manufactured by copolymerizing acrylic alkyl ester monomers and unsaturated carboxylic acid monomers with a tetrahydroxyfurfuryl acrylate monomer, cyclohexyl (meth)acrylate derivatives, etc., as modifying monomers. Among these proposed methods, in the case of the method which uses ethylene-vinyl acetate copolymer emulsions, it is possible to manufacture emulsions with high concentrations, since a seed polymer which can become the nucleus for polymerizing the acrylic monomer is present. On the other hand, however, the make-up of the finally-produced polymer particles becomes non-uniform, and as a result there are insufficient increases of the low-temperature adhesiveness and the adhesiveness under ordinary conditions. Moreover, in the method using a tetra-hydroxyfurfuryl monomer, etc., as modifying monomers, the copolymerizabilities of these compounds are not good, and therefore the emulsion obtained is poor in mechanical and chemical stabilities, and the effect of increasing its adhesive force with respect to polyolefin resins is insufficient.

Thus, even though attempts have been made up to now to change the actual composition of the acrylic high-molecular-weight polymer which is the principal ingredient of the acrylic high-molecular-weight polymer emulsion, and even though methods have been used in which, for example, a tackifying agent resin is blended with the acrylic high-molecular-weight polymer emulsion, or added to it at the time of the polymerization, the situation at present is that it has not been possible to increase the adhesive force under normal conditions and the low-temperature adhesive force with respect to low-polarity polyolefin resins.

This invention was made with this situation in view and has the purpose of providing a pressure-sensitive adhesive emulsion composition with increased adhesive force under normal conditions and low-temperature adhesive force with respect to low-polarity polyolefin resins, etc., and a kraft tape using this composition.

SUMMARY OF THE INVENTION

In order to accomplish this purpose, this invention is a pressure-sensitive adhesive emulsion composition characterized by the fact that it consists of two ingredients (A) and (B), mentioned below; the content of ingredient (B) is set at 1–70 solid parts per 100 solid parts by weight of the emulsion composition.

(A) A polymer derived from at least one compound selected from a group including alkyl acrylates, alkyl methacrylates, and vinyl compounds, and having a glass transition temperature in the range of $-60°$ C. to $-30°$ C.

(B) A bituminous emulsifier with an average particle diameter of the emulsified particles of 0.5–3.0 $\mu$m.

The second part of this invention is a kraft tape the pressure-sensitive adhesive layer of which is formed by the aforementioned pressure-sensitive adhesive emulsion composition.

DETAILED DESCRIPTION

The inventors, in the course of performing research with the purpose of improving the aforementioned defects in emulsions composed principally of acrylic polymers, noted that bituminous materials such as asphalt have high viscosities, and tried introducing them into the emulsion. That is, they made emulsion compositions by emulsifying the aforementioned bituminous materials in water by the action of surface active agents, etc., to make bituminous emulsifiers, and added these to the emulsion. As a result of investigating the properties of these emulsions, they discovered that when the aforementioned bituminous emulsifiers are compounded with the emulsions in a specific range, the adhesive forces with respect to polyolefin resins, etc., under normal conditions and at low temperatures were increased, while the balance of the pressure-sensitive triple properties was maintained; thus they achieved this invention. The fact that the aforementioned result was obtained by adding bituminous emulsifiers in this way seems to be due to the fact that the acrylic ester polymer, etc., in the emulsion composition becomes the matrix in the (pressure-sensitive) adhesive layer, and a so-called ocean-island structure is formed, in which the bituminous material particles of the bituminous emulsifier are dispersed at random in this matrix.

Moreover, the inventors discovered, as a result of performing research with the idea of applying the aforementioned emulsion composition to the pressure-sensitive adhesive layer of kraft tapes, that adhesive layers using the aforementioned emulsion composition showed the same adhesive strengths as rubber adhesive layers, and had better weather and heat resistances than rubber adhesives. In addition, the aforementioned emulsion composition has the advantages that it can be designed according to various requirements, and its properties can be adjusted to the ones required of the adhesive layer, without harming the physical properties of the composition.

The pressure-sensitive adhesive emulsion composition of this invention uses as ingredient (A) a polymer derived from alkyl acrylates, alkyl methacrylates, or vinyl compounds, with a glass transition temperature in the range of $-60°$ C. to $-30°$ C., and as ingredient (B) a bituminous emulsifier with an average particle diameter of the emulsified particles of 0.5–3.0 $\mu$m.

As the alkyl acrylates, alkyl methacrylates, or vinyl compounds which serve as raw materials for the aforementioned ingredient (A), one can use the following concrete examples: as alkyl acrylates: methyl acrylate, ethyl acrylate, 2-ethylhexyl acrylate, normal butyl acrylate, isobutyl acrylate, hydroxyethyl acrylate, hydroxypropyl acrylate, trimethylol propane triacrylate, etc. Functional groups may also be bonded with these compounds. Concrete examples of alkyl methacrylates which can be used include methyl methacrylate, ethyl methacrylate, normal butyl methacrylate, isobutyl methacrylate, lauryl methacrylate, methoxydiethylene methacrylate, methoxypoly(ethylene glycol) methacrylate, hydroxyethyl methacrylate, hydroxypropyl methacrylate, dimethylaminoethyl methacrylate, glycidyl methacrylate, tetraethylene glycol dimethacrylate, trimethylol propane trimethacrylate, etc. Moreover, functional groups may also be bonded with these compounds. Moreover, as concrete examples of vinyl compounds, one can use styrene, $\alpha$-alkyl styrene, $\alpha$-chlorostyrene, vinyl acetate, acrylonitrile, vinyl chloride, etc. These raw material compounds of ingredient (A) can be used individually or in combination. These raw material compounds of ingredient (A) can be polymerized by publicly-known emulsion polymerization methods. In this case, the glass transition temperature of the polymer must be set within the range of $-60°$ C. to $-30°$ C. If it is outside the aforementioned range, a sufficient effect cannot be obtained.

As the bituminous emulsifier of ingredient (B), mentioned above, an oil-drops-in-water bituminous emulsifier is used; concrete examples of these are straight asphalt, semi-blown asphalt, blown asphalt, natural asphalt, cut-back asphalt, coal tar, oil tar, tar pitch, petroleum pitch, tall oil pitch, fatty acid pitch, and other bituminous materials. These may be used individually or in combination, and the emulsifier is produced by emulsifying these materials in water. To emulsify the aforementioned bituminous materials, emulsification is generally performed by using suitable surfactants, stabilizers, protective colloids, etc. Bituminous emulsifiers of this kind are classified into cationic, anionic, and nonionic types, depending on the kind of surfactant used. These bituminous emulsifiers must have average particle diameters of their emulsified particles which are in the range of 0.5–3.0 $\mu$m. A preferable range is 0.5–1.0 $\mu$m. Moreover, it is desirable from the point of view of effectiveness to use ones with particle system distributions (weight-average particle diameter/number-average particle diameter, referred to below as "dw/dn") in the range of 1.0–1.5. That is, if the average particle diameters of the emulsified particles of the aforementioned bituminous emulsifiers are outside this range, it is difficult to obtain suitable ocean-island structures, and the desired effect cannot be obtained. To explain in further detail, if the average particle diameter is less than 0.5 μm, it becomes difficult for the emulsified particles to form a uniform dispersed system in the emulsion state, and an ocean-island structure is difficult to obtain in the film state. Conversely, if it is greater than 3.0 μm, it becomes difficult to form a uniform dispersion system at the stage at which the bituminous emulsifier is compounded with the aforementioned emulsion composition, and poor distribution or a conglomerating action of the bituminous emulsifier particles is caused, so that the mechanical and chemical stabilities of the emulsion composition become extremely poor. Furthermore, if the aforementioned particle diameter distribution is outside the range of 1.0–1.5, a dispersion system may be formed, and the average particle diameter may be within the aforementioned suitable range, but the balance between the continuous phase and the dispersion phase becomes difficult to maintain, and a continuous phase of bituminous emulsifier particles is partially produced in the blend system, so that a tendency for two phases, the polymer emulsion and the bituminous emulsifier, to be present as continuous phases is seen. As a result, when the continuous phase is deformed, cracks are produced between the two phases, and it is difficult to obtain the effect of increasing the peeling strength.

The pressure-sensitive adhesive emulsion composition of this invention can be manufactured, for example, as follows. First, the unsaturated monomer, such as the aforementioned alkyl acrylate raw material compound for ingredient (A) is compounded with (if desired) surfactants, initiators, buffer solutions, etc., in a specific proportion, and the aforementioned raw material is emulsified by applying publicly-known methods such as semi-continuous emulsion polymerization, one-step emulsion polymerization, two-step emulsion polymerization, power feed emulsion polymerization, etc. Next, the bituminous emulsifier is added to and mixed with this emulsion. In this way, the target pressure-sensitive adhesive emulsion composition is obtained. In this case, the quantity of bituminous emulsifier compounded must be set at 1–70 solid parts per 100 solid parts by weight (abbreviated below as "parts") of the emulsion composition. That is, if the quantity of the bituminous emulsifier is reduced below one part, the effect of improving the adhesive force is not observed. This is because, since there are few bituminous emulsifier particles, there is a decrease in the cohesive force, and the desired effect of increasing the adhesive force is not seen. Conversely, if it is greater than 70 solid parts, the glass transition temperature of the blend system greatly exceeds −30° C., so that the adhesive layer composed of the pressure-sensitive adhesive emulsion composition does not sufficiently reach the rubber-like region at room temperature, and its tack is reduced. Furthermore, in this state, an unstable ocean-island phase mixed system is produced, and there is a rebound transition to the island-ocean phase form, due to surface tension. As a result, the phenomenon of decreases in both the adhesive force and the cohesive force is caused. Consequently, it is necessary for the proportion in which the bituminous emulsifier is used to be set within the aforementioned range.

The pressure-sensitive adhesive emulsion composition obtained in this way forms a so-called uniform dispersion system of the aforementioned polymer ingredient (A) and the bituminous emulsifier ingredient (B), and an ocean-island structure is formed at the stage of forming a dry film. That is, in the pressure-sensitive adhesive layer consisting of the aforementioned dry film, a two-phase structure (ocean-island structure) is formed, in which the bituminous material of the bituminous emulsifier is randomly dispersed as particles in the matrix which consists of the aforementioned polymer. Because of this, the adhesive force and cohesive force can be greatly increased, while a balance is preserved between the pressure-sensitive triple properties (adhesive force, cohesive force, and tack).

Consequently, with the pressure-sensitive adhesive emulsion composition of this invention, the adhesive forces with respect to polyolefins under normal conditions and low temperatures, etc., are greatly increased, compared to conventional acrylic high-molecular-weight polymer emulsions, which have insufficient adhesive forces of these kinds.

Moreover, since the pressure-sensitive adhesive emulsion composition of this invention is uniform and stable, and contains almost no agglomerations of the bituminous emulsifier or agglomerations of the polymer, or large particles formed from these, it has good mechanical stability, dispersion stability, and stability over time. Consequently, a good emulsified state is maintained, without the aforementioned phenomena of poor distribution of particles or liberation of particles occurring, and a viscosity which is close to Newtonian is shown, without the appearance of a thixotropic viscosity. Consequently, it has excellent suitability for roller working, and is also suitable for printing, since the tacky surface is smooth, without paint streaks, and it has a beautiful appearance. Furthermore, additives such as fillers, thickeners, bubble quenching agents, etc. can be used in the pressure-sensitive adhesive emulsion composition of this invention, if desired, and its properties can be easily improved. Moreover, the pressure-sensitive adhesive emulsion composition of this invention can be used as a tackifying agent to make a pressure-sensitive adhesive layer by painting and drying it so that the dried weight is 10–200 g/m², which can be applied to pressure-sensitive tape, pressure-sensitive sheets, and wrapping tapes, in which three layers are made, a surface base material composed of high-quality paper, coated paper, kraft paper, polyvinyl chloride film, etc., and a peeling paper as well as the adhesive layer. The kraft tape obtained in this way (a general term including the aforementioned pressure-sensitive tape, pressure-sensitive sheet, wrapping tape, packaging tape, etc.), has a (pressure-sensitive) adhesive layer which is composed of the aforementioned pressure-sensitive adhesive emulsion composition; hence, an excellent adhesive strength is shown which is almost the same as that of rubber, etc. adhesive strengths. Moreover, this (pressure-sensitive) adhesive layer has excellent weather, heat, and water resistances.

As mentioned above, the pressure-sensitive adhesive emulsion composition of this invention is composed of the aforementioned ingredients (A) and (B) in specific proportions; hence, it is stable in the emulsion state, and in the state in which this composition is applied and dried to form a film (pressure-sensitive) adhesive layer, this adhesive layer shows an excellent adhesive strength, almost equal to that of rubber, etc., adhesive layers, and also has weather, heat, and water resistance, which are lacking in adhesive layers composed of rubber, etc. In particular, this invention, being compounded of the aforementioned ingredients (A) and (B) in the specific proportions mentioned above, greatly increases the adhesive strength of the adhesive layer, without destroying the balance of the pressure-sensitive triple properties, adhesive force, cohesive force, and tack. Moreover, the adhesive forces with respect to low-polarity resins such as polyolefin resins are greatly increased; this was not achievable with the conventional acrylic high-molecular-weight polymer emulsions. Moreover, it becomes possible to produce kraft tapes with adhesive layers with excellent moisture and weather resistance, heat resistance, and water resistance, such as are not seen in rubber adhesive layers.

The following examples set forth below are working examples which serve to illustrate the present invention and are not to be regarded as limitative. All parts, percentages and proportions referred to herein and in the claims are by weight unless otherwise indicated.

ACTUAL AND COMPARISON EXAMPLES (Manufacturing of Emulsion Composition)

First, the monomer raw materials shown in Table 1 below were compounded in the proportions shown in this table to make a monomer mixture solution. On the other hand, 0.3 parts sodium polyoxyethylene alkyl phenyl ether sulfate, 1 part polyoxyethylene nonyl phenyl ether (HLB: 10), and 0.4 part sodium acetate were dissolved in 30 parts deionized water to make a surfactant aqueous solution. Next, this surfactant aqueous solution was mixed with the monomer compositions of the aforementioned compositions, and emulsified, producing a monomer pre-emulsion.

Next, 10 wt % of the whole monomer pre-emulsion obtained as described above was introduced into a reactor provided with a stirrer, thermometer, and cooling tube, together with 25 parts deionized water. While nitrogen gas was allowed to flow into the reactor, the temperature was raised to 75° C., while stirring, and the initial polymerization was performed for 30 minutes. The remaining 90 wt % of the monomer pre-emulsion and 0.3 parts sodium persulfate were dissolved in 7 parts deionized water to make an initiator aqueous solution. Next, this initiator aqueous solution was dropped into the aforementioned reactor over a period of 4 hours, performing the polymerization reaction. During this polymerization reaction, the temperature was kept at 75°-80° C. After the dropping in of the initiator aqueous solution was stopped, the final polymerization was performed for 2 hours, keeping the temperature at 80° C. The emulsion was made in this way. The properties of this emulsion are shown in Table 1 below.

(Manufacturing of Pressure-Sensitive Adhesive Emulsion Composition)

To 100 parts of the emulsion manufactured as described above, the bituminous emulsifiers shown in Table 1 below were added, in the quantities shown in this table, and the result was stirred for 10 minutes with a Homodisper homogenizer (made by Tokushu Kikai Kogyo Co., Ltd.) at 3000 rpm. The properties of the pressure-sensitive adhesive emulsion composition obtained in this way are shown in Table 1. The properties of the emulsion were measured in the following ways:

(1) Solid concentration (unit: %)

Weighted after drying for 3 hours at 105° C., following JIS-K6839.

(2) Average particle diameter (unit: μm)

Sample emulsions were diluted and measurements were performed with a laser particle diameter analysis system LPA-3000/3100 (made by Otsuka Denshi Co. Ltd.).

(3) Viscosity (unit: cps)

Measurement performed following JIS-K6838, using a BM rotating viscometer with a rate of rotation of 60 rpm, unless otherwise mentioned.

(4) Mechanical stability (dispersion stability)

In order to investigate the mechanical stability when a high shear force was applied to the emulsion for a specific time, a high-speed rotating viscometer made by Haake Co. was used; after a high shear force was applied to the sample emulsion by rotating at 10,000 rpm for approximately 10 minutes, changes in the state of production of coagulated material and the viscosity were observed, and the mechanical stability was evaluated from these factors. The evaluation was performed in 4 steps: good, rather good, rather poor, and poor.

(5) Phase states of ingredients (A) and (B)

In order to observe the phase states of ingredient (A) and the bituminous emulsifier ingredient (B) in the emulsion, the sample emulsion was made into a film and the film was stained and fixed with osmic acid and observed at a magnification of 50,000X with a transmission electron microscope (H-500H, made by Hitachi Ltd.), following the method developed by K. Kato et al. [*Electron Microsc.*, 14, 219 (1966)]. According to this method, there is a difference in the electron beam transmission rates of the domains of ingredient (A) and the domains of the bituminous emulsifier ingredient (B) when the sample emulsion is made into a film: the domains of ingredient (A) show a pale gray color, while the domains of the bituminous emulsifier ingredient (B) are photographed as a black-brown color, so that the phase states of both ingredients can be seen.

The results of this observation are shown as follows.

A. Condition in which the bituminous emulsifier particle domains of ingredient (B) are randomly dispersed, as the dispersed phase, in ingredient (A), as the continuous phase (ocean-island structure)

B. Condition in which bituminous emulsifier particles of ingredient (B) are coagulated and poorly distributed in the continuous phase ingredient (A)

C. Condition in which the ingredient (A) and some of the bituminous emulsifier particles exist as continuous phases, and the rest of the bituminous emulsifier particle domains are poorly distributed in ingredient (A)

D. Condition in which the two phases are completely separated and poorly distributed E. Condition in which the bituminous emulsifier particles of ingredient (B) are randomly distributed in the particle state, without forming domains, in the ingredient (A), as the continuous phase

TABLE 1

| | Actual Examples | | | | | | |
|---|---|---|---|---|---|---|---|
| | 1 | 2 | 3 | 4 | 5 | 6 | 7 |

TABLE 1-continued

| Monomer (parts) | | | | | | | |
|---|---|---|---|---|---|---|---|
| Methyl acrylate (MA) | 30 | — | — | — | — | — | — |
| Butyl acrylate (BA) | — | 65 | — | — | — | — | — |
| Ethyl acrylate (EA) | — | — | 24 | — | — | — | — |
| Vinyl acrylate (VAc) | — | — | — | 13 | — | — | — |
| Styrene (St) | — | — | — | — | 9 | — | — |
| Methyl methacrylate (MMA) | — | — | — | — | — | 9 | — |
| Acrylonitrile (AN) | — | — | — | — | — | — | 9 |
| 2-ethylhexyl acrylate (2 EHA) | 68 | 33 | 74 | 85 | 89 | 89 | 89 |
| Acrylic acid (AA) | 2 | 2 | 2 | 2 | 2 | 2 | 2 |
| N-methylol acrylamide (N-MAN) | 3 | — | — | — | — | — | — |
| Emulsion produced | | | | | | | |
| Solid concentration (%) | 60.3 | 59.8 | 60.0 | 60.0 | 60.0 | 60.0 | 60.0 |
| Viscosity (cps) | 600 | 500 | 600 | 600 | 400 | 600 | 600 |
| pH | 3.7 | 2.3 | 2.0 | 2.4 | 2.1 | 2.2 | 2.5 |
| Average particle diameter ($\mu$m) | 0.45 | 0.26 | 0.27 | 0.32 | 0.20 | 0.25 | 0.26 |
| Glass transition temperature (°K.) | 218 | 227 | 227 | 227 | 218 | 218 | 218 |
| Pressure-sensitive adhesive emulsion composition | | | | | | | |
| Quantity of bituminous emulsifier added (solid parts by weight) | 2 | 2 | 2 | 2 | 2 | 2 | 2 |
| Average particle diameter ($\mu$m) | 0.95 | 0.95 | 0.95 | 0.95 | 0.95 | 0.95 | 0.95 |
| Bituminous emulsifier particle diameter distribution (dw/dn) | 1.2 | 1.2 | 1.2 | 1.2 | 1.2 | 1.2 | 1.2 |
| Solid concentration (%) | 60.3 | 60.0 | 60.0 | 60.0 | 60.0 | 60.0 | 60.0 |
| Viscosity (cps) | 3000 | 2000 | 3000 | 3000 | 2500 | 3100 | 3000 |
| pH | 6.0 | 6.0 | 6.0 | 6.0 | 6.0 | 6.0 | 6.0 |
| Mechanical stability | Good | Good | Good | Good | Good | Good | Good |
| Phase states of ingredients (A) and (B) | A | A | A | A | A | A | A |

| | Comparison Examples | | | | |
|---|---|---|---|---|---|
| | 1 | 2 | 3 | 4 | 5 |
| Monomer (parts) | | | | | |
| Methyl acrylate (MA) | 30 | — | — | — | — |
| Butyl acrylate (BA) | — | 65 | 65 | 65 | 65 |
| Ethyl acrylate (EA) | — | — | — | — | — |
| Vinyl acrylate (VAc) | — | — | — | — | — |
| Styrene (St) | — | — | — | — | — |
| Methyl methacrylate (MMA) | — | — | — | — | — |
| Acrylonitrile (AN) | — | — | — | — | — |
| 2-ethylhexyl acrylate (2 EHA) | 68 | 33 | 33 | 33 | 33 |
| Acrylic acid (AA) | 2 | 2 | 2 | 2 | 2 |
| N-methylol acrylamide (N-MAN) | 3 | — | — | — | — |
| Emulsion produced | | | | | |
| Solid concentration (%) | 60.3 | 59.8 | 59.8 | 59.8 | 59.8 |
| Viscosity (cps) | 400 | 600 | 600 | 600 | 600 |
| pH | 3.7 | 2.3 | 2.3 | 2.3 | 2.3 |
| Average particle diameter ($\mu$m) | 0.45 | 0.26 | 0.26 | 0.26 | 0.26 |
| Glass transition temperature (°K.) | 218 | 227 | 227 | 227 | 227 |
| Pressure-sensitive adhesive emulsion composition | | | | | |
| Quantity of bituminous emulsifier added (solid parts by weight) | 0 | 2 | 2 | 0.5 | 75 |
| Average particle diameter ($\mu$m) | — | 0.3 | 5.0 | 0.95 | 0.95 |
| Bituminous emulsifier particle diameter distribution (dw/dn) | — | 1.5 | 1.3 | 1.2 | 1.2 |
| Solid concentration (%) | 60.3 | 60.3 | 60.5 | 60.3 | 60.5 |
| Viscosity (cps) | 2500 | 3500 | 2700 | 300 | 4000 |
| pH | 6.0 | 6.0 | 6.0 | 6.0 | 6.0 |
| Mechanical stability | Good | Poor | Poor | Good | Poor |
| Phase states of ingredients (A) and (B) | — | B | B | C | D |

Note:
Comparison Example 1: same as Actual Example 1, except that no bituminous emulsifier was used
Comparison Example 2 and 3: same as Actual Example 2, except particle diameters of bituminous emulsifiers were outside upper and lower limits Moreover, the properties, such as adhesive force, etc., of the pressure-sensitive adhesive emulsion compositions obtained as described above were obtained; the results are shown in Table 2 below.

These properties were measured as follows:
(1) Adhesive force under normal conditions (adhesive force at room temperature) (unit: g/25 mm)

Each adhesive sample was applied to one side of a 50 $\mu$m thick polyester film, so that its thickness after drying was 25 $\mu$m, and drying at 105° C. was performed for 5 minutes to make pressure-sensitive adhesive tapes.

The adhesive sides of these pressure-sensitive adhesive tapes were stuck to the surfaces of stainless steel plates (abbreviated below as "SS plates"), following the method of JIS-Z0237, and the peeling adhesive strengths (pulling at 180°) were measured in a 20° C., 65% RH atmosphere.

Moreover, the same method was used, with high-density polyethylene plates (abbreviated below as "PE plates") as the objects to which the tapes were adhered, instead of the SS plates mentioned above, and the adhesive forces of the tapes were recorded as the adhesive forces under normal conditions.

(2) Adhesive force under low temperatures (unit: g/25 mm)

The measurements were performed in the same manner as in the case of the measurement of the adhesive force under normal conditions, except that the temperature when the adhesive force was measured was changed to −20° C., and these adhesive forces were recorded as the adhesive forces under low temperatures.

(3) Water-resistant adhesive force (unit: 25 mm)

The adhesive surfaces of the pressure-sensitive tapes used in the measurement of the adhesive force under normal conditions were stuck to the surfaces of PE plates, following JIS-Z0237, and these samples were immersed in water for 3 days, after which the moisture was thoroughly removed and the peeling adhesive force (pulling at 180°) was measured in a 20° C., 65% RH atmosphere.

(4) Ball tack (tack) (J. Dow method) (unit: number of balls)

Measured according to JIS-Z0237, with an angle of inclination of 30°.

(5) Holding force (unit: minutes)

Following JIS-Z0237, a load of 1 kg was applied, and the time elapsed until the load dropped, in a 40° C., 65% RH atmosphere, was measured and recorded. This holding force is used as a measure of the cohesive force.

balance, as in Comparison Example 2. Moreover, the states of the bituminous emulsifier and polymer phases were poor, as in Comparison Example 2. The composition of Comparison Example 4 had good mechanical stability, but its adhesive force under normal conditions was poor, and the states of the bituminous emulsifier and polymer phases were also poor. With the composition of Comparison Example 5, coagulation of the bituminous emulsifier particles was produced, and when its mechanical stability was investigated, the emulsion was destroyed 1 minute after the high shear force was applied, so that the stability was seen to be poor.

Manufacturing of Kraft Tape

After the pressure-sensitive adhesive emulsion composition of Actual Example 1 and that of Comparison Example 1, obtained as described above, were neutralized with 25% ammonia water, their viscosities were adjusted to 8000 cps by compounding Vissurf (Kao Co., thickener) with them. Using three reverse roller coaters, these compositions were applied to unbleached kraft paper for making tape, with a weight of 73 g/m$^2$, in the proportion of 60 g/m$^2$, under the condition of an application speed of 80/min. In this way, kraft packaging tapes were made.

Moreover, as Comparison Example 7, a kraft packaging tape was made by using natural rubber from the adhesive layer. This tape was made in the following way. One hundred parts roughly kneaded natural rubber (made by Shell Chemical Co.), 50 parts zinc white,

TABLE 2

| | | Actual Example | | | | | | | Comparison Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Adhesive force | | | | | | | | | | | | | |
| Normal conditions | SS Plates | 1,000 | 1,000 | 1,050 | 1,000 | 950 | 900 | 1,000 | 800 | 500 | 510 | 800 | 200 |
| | PE Plates | 700 | 720 | 740 | 700 | 640 | 700 | 700 | 300 | 120 | 120 | 300 | 30 |
| Low temp | PE Plates | 1,000 | 1,000 | 1,100 | 1,000 | 950 | 1,000 | 1,400 | * | * | * | * | * |
| Water Resistance | PE Plates | 600 | 600 | 600 | 540 | 530 | 600 | 600 | 300 | 90 | 70 | 300 | 5 |
| Ball tack (No. of balls) | | 9 | 9 | 9 | 9 | 8 | 9 | 9 | 9 | 7 | 7 | 9 | 3 |
| Holding force | | 300 | 300 | 300 | 300 | 300 | 300 | 300 | 270 | 300 | 240 | 240 | 25 |
| Suitability for roller application | | Good | Good | Good | Good | Good | Good | Good | Poor | Poor | Poor | Poor | Poor |

*Jippingu [zipping, dipping?] phenomenon produced

From the results of Tables 1 and 2, it can be seen that the pressure-resistant adhesive emulsion compositions of the actual examples of this invention have good mechanical stabilities, applicabilities, and other properties, and their balances of adhesive force, cohesive force, and tack are high. Moreover, their adhesive forces with respect to polyolefins, etc., under normal conditions are greatly increased. In contrast, the composition of Comparison Example 1 has markedly reduced adhesive force under normal conditions, especially with respect to PE plates, and the zipping phenomenon was produced when the low-temperature adhesive force was measured. Moreover, the balance of adhesive force, cohesive force, and tack was not satisfactory. The composition of Comparison Example 2 had a markedly lowered balance of adhesive force, cohesive force, and tack, and the states of the bituminous emulsifier and polymer phases were poor: the bituminous emulsifier particles were coagulated and poorly distributed in the continuous phase. The composition of Comparison Example 3 had inferior properties, such as mechanical stability, in the same way as Comparison Example 2, and in addition there was a reduction in the property 75 parts natural rosin (made by Crosby Co.), 2 parts sym-di-$\beta$-naphthyl-p-diaminophenylene, and 10 parts lanolin were put into a reactor provided with a stirrer and an apparatus for raising the temperature. Kneading was performed at a temperature above the softening points of the natural rubber and the natural resin rosin. Next, this mixture was allowed to cool naturally, and its solid concentration was adjusted to 50% by diluting it with normal hexane. This product was used instead of the aforementioned pressure-sensitive adhesive emulsion compositions to make the kraft tape. As Comparison Example 8, a kraft packaging tape was made using synthetic rubber as the adhesive layer. This tape was made in the following way. First, 40 parts ethylene-vinyl acetate copolymer (EVA, Sumitomo Chemical Industries Co.), 10 parts polyvinyl acetate, 40 parts aromatic hydrocarbonformaldehyde resin, 10 parts microcrystalline wax, and 1 part anti-oxidant were put into a melting and stirring device, and a melting and blending treatment was performed at 200° C. for 2 hours. The product was put into a block hot melt molder and molded, after which it was cooled, and a suitable quantity was then taken and applied to the aforementioned kraft paper in the proportion of 60 g/m², using hot rollers, to make the tape.

The low-speed tensile strengths of the kraft packaging tapes obtained in this way were measured, and are shown in Table 3.

This property was measured as follows:

Low-speed Tensile Adhesive Strength (Unit: g/25 mm)

The various samples were stuck to the surfaces of cardboards, following JIS-Z0237. The adhesive forces were then measured in the same way as in the case of the aforementioned adhesive force under normal conditions, except that the pulling speed was made 0.5 mm/min. The adhesive force obtained in this way was recorded as the low-speed tensile adhesive strength.

TABLE 3

|  | Actual Example | Comparison Examples | | |
| --- | --- | --- | --- | --- |
|  | 8 | 6 | 7 | 8 |
| Pressure-sensitive adhesive emulsion composition forming the adhesive layer | Product of Actual Example 1 | Product of Comparison Example 1 | Natural Rubber | Adhesive Rubber |
| Low-speed tensile adhesive strength of kraft tape (g/25 mm) | 300 | 180 | 210 | 280 |

As can be seen from the results of Table 3, the low-speed tensile strengths of the products of the actual examples are superior to those of the comparison examples.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed:

1. A pressure-sensitive adhesive emulsion composition, characterized in containing ingredients (A) and (B) below; the content of ingredient (B) is in the range of from 1–70 solid parts per 100 solid parts by weight of the emulsion composition, comprising
    (A) a polymer derived from at least one compound selected from a group consisting of alkyl acrylates and alkyl methacrylates, and vinyl compounds selected from the group consisting of vinyl acetate, vinyl chloride, acrylonitrile, styrene, α-alkyl styrene, and α-chlorostyrene, said polymer having a glass transition temperature in the range of −60° C. to −30° C., and
    (B) a bituminous emulsifier with an average particle diameter of the emulsified particles of 0.5 to 3.0 μm.

2. A kraft tape in which the pressure-sensitive adhesive layer is composed of the pressure-sensitive adhesive emulsion composition of claim 1.

3. The pressure-sensitive emulsifier composition of claim 1 containing a bituminous emulsifier with an average particle diameter of the emulsified particles of 0.5–1.0 μm.

4. A kraft tape in which the pressure-sensitive adhesive layer is composed of the pressure-sensitive adhesive emulsion composition of claim 3.

* * * * *